(12) United States Patent
Harrison

(10) Patent No.: US 8,460,158 B2
(45) Date of Patent: Jun. 11, 2013

(54) TRANSMISSION CONTROL DEVICES AND SYSTEMS, AND METHODS OF ASSEMBLY AND USE THEREOF

(75) Inventor: Robert Harrison, Lamar, MS (US)

(73) Assignee: Competition Cams, Memphis, TN (US)

( * ) Notice: Subject to any disclaimer, the term of this patent is extended or adjusted under 35 U.S.C. 154(b) by 791 days.

(21) Appl. No.: 12/606,321

(22) Filed: Oct. 27, 2009

(65) Prior Publication Data

US 2010/0107625 A1    May 6, 2010

Related U.S. Application Data

(60) Provisional application No. 61/110,625, filed on Nov. 3, 2008.

(51) Int. Cl.
| | |
|---|---|
| *F16H 61/26* | (2006.01) |
| *F16H 61/00* | (2006.01) |
| *F16H 61/06* | (2006.01) |
| *F16H 61/08* | (2006.01) |

(52) U.S. Cl.
USPC ........... 477/127; 477/130; 477/146; 477/149; 477/160; 477/163; 477/164

(58) Field of Classification Search
USPC .................. 475/296; 477/127, 130, 146, 149, 477/160, 163, 164
See application file for complete search history.

(56) References Cited

U.S. PATENT DOCUMENTS

| | | | | |
|---|---|---|---|---|
| 4,226,200 | A * | 10/1980 | Morisawa et al. | 74/606 R |
| 5,140,871 | A * | 8/1992 | Goto et al. | 477/131 |
| 5,269,204 | A * | 12/1993 | Moroto et al. | 477/131 |
| 5,339,709 | A * | 8/1994 | Suzuki et al. | 477/145 |
| 5,679,086 | A * | 10/1997 | Ando et al. | 475/116 |
| 5,835,875 | A * | 11/1998 | Kirchhoffer et al. | 701/51 |
| 7,287,444 | B2 * | 10/2007 | Carne | 74/606 R |
| 8,167,755 | B2 * | 5/2012 | Martin et al. | 475/116 |

* cited by examiner

*Primary Examiner* — Tisha Lewis
(74) *Attorney, Agent, or Firm* — Arent Fox LLP

(57) ABSTRACT

Features for varying speeds available and/or range of operation of transmissions are provided for use in high performance, increased efficiency, and/or other applications. Increased performance and/or efficiency may be obtained by using additional speeds or gear ranges to maintain drivetrain operation within maximum power and/or efficiency bands of internal combustion engine operation.

15 Claims, 3 Drawing Sheets

TRANSMISSION CONTROL DEVICES AND SYSTEMS, AND METHODS OF ASSEMBLY AND USE THEREOF

This application claims priority form U.S. Provisional Patent Application No. 61/110,625, filed on Nov. 3, 2008, titled "Transmission Control devices and Systems, and Methods of Assembly and Use thereof," and which is incorporated herein by reference in its entirety.

BACKGROUND OF THE INVENTION

1. Field of the Invention

Aspects of the present invention relate to the field of transmissions, including transmission control, and modification of transmissions for improved operation for use with combustion engine applications, as well as methods of assembly and use thereof.

2. Background of the Technology

Today's high costs of petroleum fuels that power vehicles is escalating. Accordingly, there is an unmet need in the prior art for increasing range of operation and/or other improved operation, among other things, for transmissions for use in racing, enhanced economical, other high performance, and/or other applications, in order to improve vehicle performance and fuel economy.

For example, one problem with related art transmissions, particularly older transmissions that may be robust in their ability to withstand high torque/horsepower input and/or handle extreme loads is that these transmissions typically have a limited number of gear ranges or speeds available (e.g., four speeds), thereby limiting maximization of performance bands of these transmissions relative to transmissions with greater ranges of speeds/gears. Among other things, these transmissions may not be as efficient or as useful in high performance applications as transmissions with more speeds.

Another problem of the related art transmissions more recently under development or production is that these transmissions, while often having more speeds and generally being more nimble in operation for improved efficiency, may not be robust or durable in handling high toque/horsepower and/or load extremes. For example, these transmissions may use sensors to limit transmission of torque/horsepower (e.g., by reducing fuel to the internal combustion engine) or reduce the gear/speed engaged to prevent damage that would otherwise occur to the transmission. As a result, these transmissions are often less useful for high torque/speed and/or other load applications.

SUMMARY OF THE INVENTION

Aspects of the present invention provide features for varying speeds available and/or range of operation of transmissions for use in high performance, increased efficiency, and/or other applications. For example, transmissions in accordance with aspects of the present invention may be used for racing or other high performance applications of combustion engines (e.g., high performance vehicle applications), and/or for increased efficiency, such as when used in heavy duty or other high load vehicle operation (e.g., Humvee operation; recreational vehicles having high loads). Increased performance and/or efficiency may be obtained, for example, by using additional speeds or gear ranges (interchangeably and/or collectively referred to herein as "speed" or "level of transmission") to maintain drivetrain operation within maximum power and/or efficiency bands of internal combustion engine operation.

In one exemplary implementation, aspects of the present invention enhance the performance of a transmission by providing one or more additional actuating mechanisms, such as one or more additional shift solenoids or other valve assembly operation mechanisms or other features; altered valve assembly hydraulic pathway(s) and/or other hydraulic fluid flow variation; and/or variation of a control module for the transmission, such as an electronic or computerized control for monitoring and/or controlling operation.

In one exemplary variation, an unmodified robust four speed transmission has two control or actuating mechanisms (e.g., shift solenoids) for the valve assembly to control speed selection. A third control mechanism is added to the transmission, and the valve body is produced or modified so as to allow combinations of control for the gear portions (e.g., planetary gears; clutch packs) of the transmission, thereby increasing the number of speeds available. In addition, the control module may be modified or replaced, such that the three control mechanisms and other features operate appropriately to produce operation consistent with a preferred range of operation (e.g., five or six speeds, selectively engaged to maximize performance and/or efficiency of operation).

Additional advantages and novel features of aspects of the invention will be set forth in part in the description that follows, and in part will become more apparent to those skilled in the art upon examination of the following or upon learning by practice of the invention.

DETAILED DESCRIPTION

Figure 1:
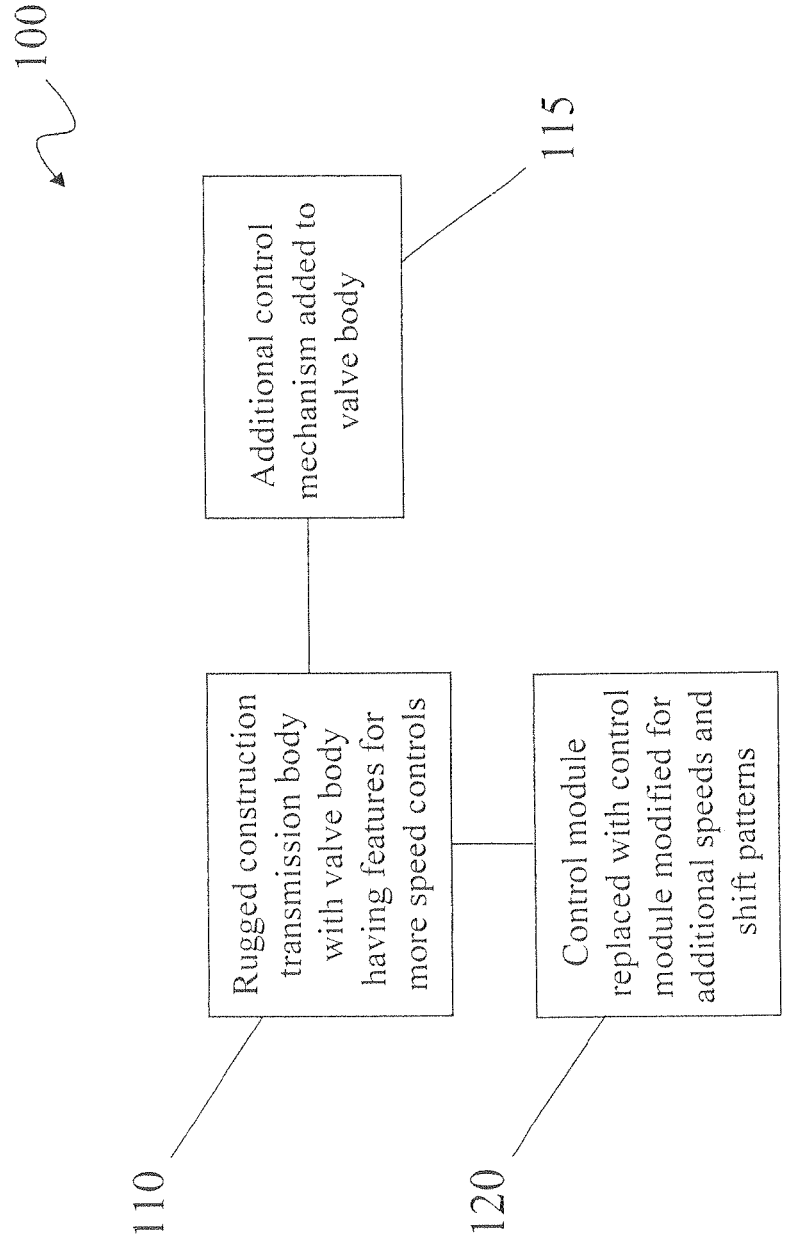
FIG. 1 is a representative block diagram of various components of an exemplary transmission in accordance with aspects of the present invention.

FIG. 1 is a representative block diagram of various components of an exemplary transmission in accordance with aspects of the present invention. As shown in FIG. 1, the transmission 100 has a transmission body 110 with a durable, heavy duty construction (interchangeably referred to herein as of a "rugged" use type), such as is typical for transmissions for use in heavy duty and/or high durability applications (e.g., truck, high performance, or towing uses). Such transmissions typically have less forward speeds than normal duty transmissions that have been used in standard duty applications. For example, the typical "factory installed" rugged type General Motors (GM) and/or General Dynamics 4L80E type transmission may be used in truck, Humvee, and recreational vehicle use applications and has three or four forward speeds (see, e.g., features and operations described in "Hydra-Matic 4L80-E Technician's Guide" (1990), the entire contents of which are incorporated herein by reference).

In contrast, the standard modern transmission used on many passenger vehicle applications may have six or seven gears, but may not have features within the transmission to withstand the loads and/or use extremes needed for heavy duty applications. For example, in these types of transmissions, gear train components may be unable to withstand such heavy duty uses, and load extremes are typically avoided by sensing and controlling transmission operation during load extremes (e.g., by sensing load conditions beyond predetermined operational limits and causing the transmission to reduce torque transmitted to the gear train or changing gears to remain within operational limits). Accordingly, transmission that is both rugged and having six or seven gears would be preferable.

The transmission valve body of the transmission 110 in accordance with aspects of the present invention has various features for increasing the number of available speeds, for example from four gears to six gears. These features may include, for example, specialized or modified fluid paths. Such specialized or modified fluid paths may include one or more sections of the valve body fluid path being filled relative to a standard valve body for such a transmission 110 or one or more fluid paths blocked or diverted. Other specialized or modified fluid paths, according to various aspects, may include one or more openings or additional bores milled or otherwise formed in one or more of the fluid paths. In addition, according to various aspects, one or more additional control or actuating mechanisms (e.g., shift solenoids) may be added to the valve body 115 to, for example, allow additional fluid-based operation to be controlled by the added control mechanism (e.g., implementation of additional forward speeds).

In some variations of the present invention, the standard rugged transmission without the features in accordance with aspects of the present invention includes multiple planetary gear sets (e.g., two or more planetary gear sets) and/or clutch packs (e.g., to lock the torque converter and/or produce other transmission operation), selective engagement of which (e.g., engagement of bands for planetary gear set engagement; operation of clutch packs) produces the set of speeds used for normal operation. The additional speeds may be obtained, for example, by combining or otherwise varying engagement of the multiple planetary gear sets and/or clutch packs, via use of the existing and/or added control mechanisms and differing fluid flow paths of the valve body, in accordance with aspects of the present invention.

Control of the control mechanisms to produce the desired output may be enabled by modifying or replacing the existing control module for the standard transmission being used 120. For example, a TCI® Transmission Control System produced by TCI Automotive of Ashland, Miss., may be modified for use with a transmission produced in accordance with aspects of the present invention.

In some variations, the valve body is modified or otherwise differs from a standard valve body in that the additional control mechanism(s) are contained within the housing profile of a standard valve body. Among other things, this approach allows the transmission to fit in a transmission location that would house a factory installed transmission by, for example, reducing or removing the need to modify vehicle features to allow installation that would be required if the transmission 110 in accordance with aspects of the present invention were to include additional features external to the profile of a standard valve body.

Figure 2:
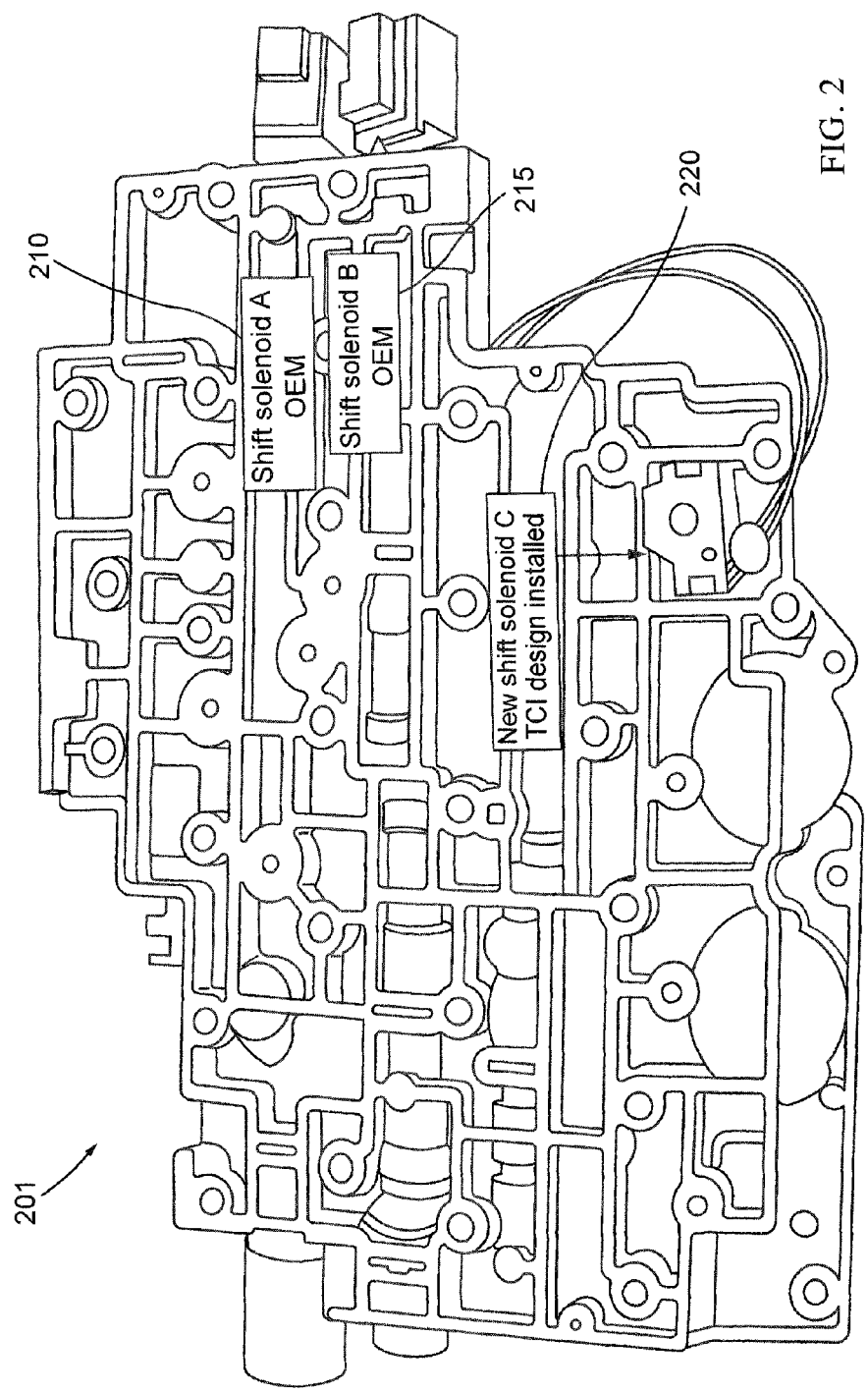
FIG. 2 is a photostat of a first portion of an exemplary transmission valve body, having various features in accordance with aspects of the present invention.

FIG. 2 is a photostat of a first portion of an exemplary transmission valve body, having various features in accordance with aspects of the present invention. As shown in FIG. 2, the valve body portion 201 includes a first control or actuating mechanism (e.g. shift solenoid A) 210 and a second control or actuating mechanism (e.g., shift solenoid B) 215 each similar to and in a similar location to the corresponding mechanisms for use with a standard transmission valve body.

In addition, a third control or actuating mechanism (e.g., shift solenoid C) 220 is installed within the valve body housing profile at the location indicated. This third control or actuating mechanism 220, in combination with the first and second control mechanisms 210, 215, when in operation in conjunction with other features in accordance with aspects of the present invention, allows the valve body in accordance with aspects of the present invention to produce additional speeds over the corresponding standard transmission.

Figure 3:
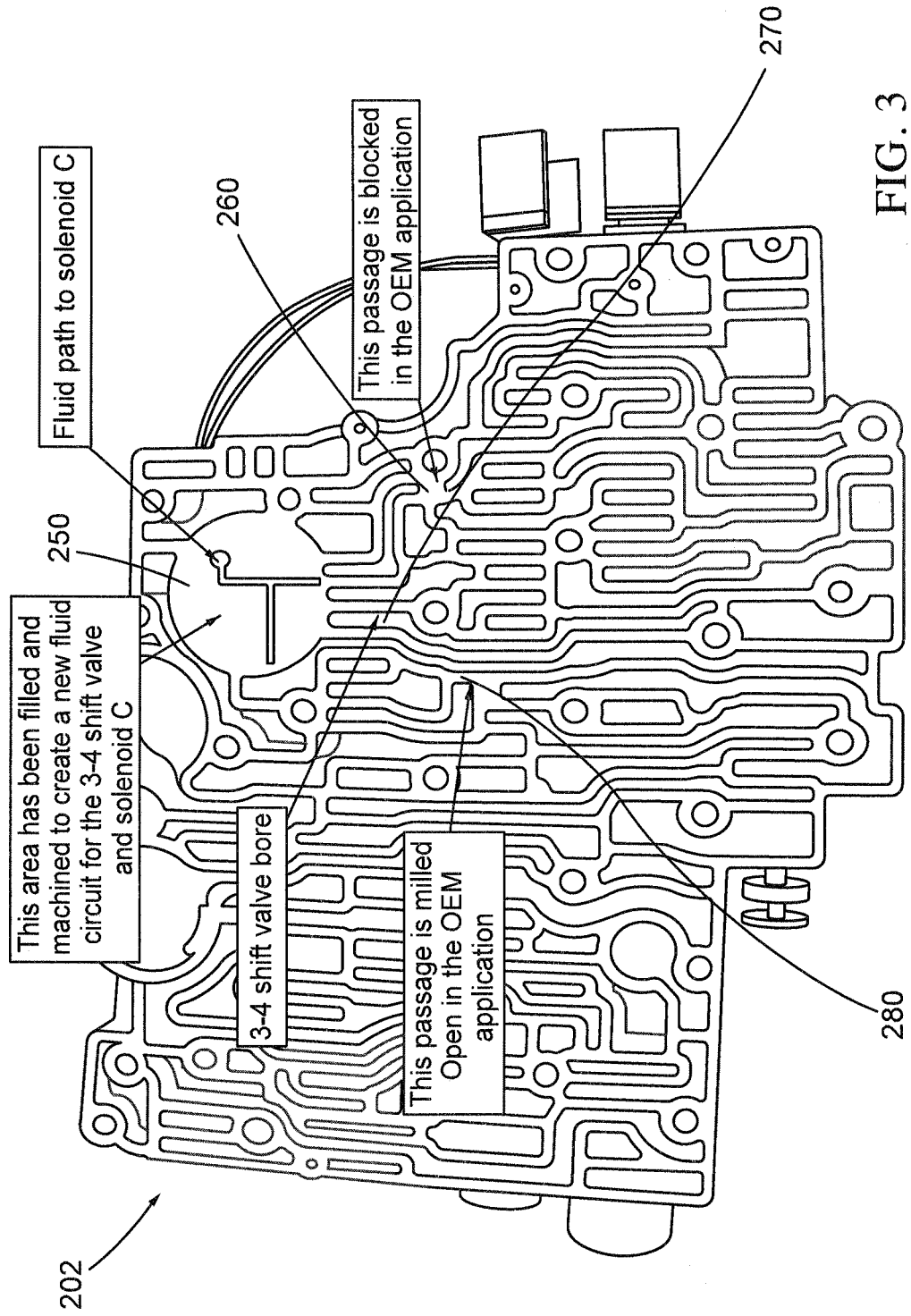
FIG. 3 is a photostat of a second portion of an exemplary transmission valve body matably usable with the first portion of FIG. 1, the valve body having various features in accordance with aspects of the present invention.

FIG. 3 is a photostat of a second portion of an exemplary transmission valve body matably usable with the first portion of FIG. 1, the valve body having various features in accordance with aspects of the present invention. As shown in FIG. 3, the valve body portion 202 includes various fluid passages similar to those typically used for a standard transmission, but with certain variations for producing operational differences in accordance with aspects of the present invention. For example, in contrast to the corresponding valve body portion for a standard transmission, the valve body portion 202 includes a portion of the valve body filled and machined 250 or otherwise formed to produce a new fluid circuit for the 3-4 shift valve and for a fluid path in communication with fluid operation controlled by the newly added control mechanism 220 of FIG. 2 (upon mating assembly of the first valve body portion 201 of FIG. 2 and the second valve body portion 202 of FIG. 3).

Also shown in FIG. 2 is the location 260 of a fluid path block (e.g., inserted dowel for variation involving modification of standard transmission valve body) for preventing fluid flow via the blocked passage. In addition, the 3-4 shift valve fluid path location for a standard transmission, which may not be used for 3-4 shift purposes in the exemplary transmission in accordance with this variation of the present invention, is indicated. Further, the location of an added passage 280 between fluid paths relative to the passages of a standard transmission is also shown.

To produce transmission operation in accordance with aspects of the present invention, a rugged transmission is used with a replacement or modified valve body to allow additional control mechanisms and/or additional operation of existing control mechanisms via new or modified fluid flow paths to change fluid output from the valve body for control of planetary gear, clutch pack, and/or other operational features of the transmission. The standard transmission control module is replaced or modified to control the control mechanisms and other features of the transmission consistent with the valve body, control mechanism, and any other transmission feature variations over the standard transmission.

For example, for producing a transmission in accordance with aspects of the present invention using some components from a standard transmission, the valve body of the standard transmission may be modified or replaced using valve body portions along the lines of those shown in FIGS. 2 and 3. The addition of the third shift solenoid C and variations in fluid passages shown in FIGS. 2 and 3 are used to allow the three shift solenoids to produce different fluid flows and operation over the standard valve body, the differing fluid flows and operation in turn being used to control operation of the unmodified and unreplaced planetary gears, clutch packs, and/or other features within the transmission. For example, six speeds may be produced using the three shift solenoids A, B, C of FIG. 2 via the combination of controls of these shift solenoids.

The three shift solenoids A, B, C of FIG. 2 may be controlled using a TCI® Transmission Control System, which may be modified to control, for example, operation of certain components of a transmission for use in accordance with aspects of the present invention. For example, the shift solenoids may be controlled to be separately and independently actuated when a given combination of throttle position and speed is achieved in order to increase the level of transmission of the vehicle to a higher level of transmission. According to various aspects of the present invention, various combinations of speed and throttle position correspond to various levels of automatic transmission.

Example aspects of the present invention have now been described in accordance with the above advantages. It will be appreciated that these examples are merely illustrative of the invention. Many variations and modifications will be apparent to those skilled in the art.

What is claimed:

1. A valve portion in a transmission valve body of a vehicle having a first control mechanism including one or more actuating devices to control fluid-based operation within the valve portion, the one or more actuating devices providing the vehicle with a first level of automatic transmission operation when the valve portion is unmodified, the valve portion when modified comprising:
    a second control mechanism that allows additional fluid-based operation within the valve portion; and
    an added fluid path conduit;
    wherein a combination of the first control mechanism, the second control mechanism and the added fluid path conduit, as modified, are configured to produce a second level of automatic transmission operation for the vehicle, the second level of automatic transmission operation not being available when the valve portion is unmodified.

2. The valve portion of claim 1, wherein at least one of the one or more actuating devices is a shift solenoid.

3. The valve portion of claim 1, wherein the second control mechanism comprises at least one second actuating device.

4. The valve portion of claim 1, wherein the second level of automatic transmission operation includes greater shift variation than the first level of automatic transmission operation.

5. The valve portion of claim 4, wherein the first level of transmission operation comprises four-speed operation and wherein the second level of transmission operation comprises six-speed operation.

6. The valve portion of claim 3, wherein the at least one second actuating devices comprises a shift solenoid.

7. The valve portion of claim 1, wherein the added fluid path conduit comprises a plurality of fluid passages to produce different fluid flows and to provide greater ranges of automatic transmission operation compared to unmodified fluid passages.

8. The valve portion of claim 7, wherein the added fluid path conduit comprises added fluid passages compared to unmodified fluid passages.

9. The valve portion of claim 7, wherein the added fluid path conduit comprises blocked fluid passages compared to unmodified fluid passages.

10. The valve portion of claim 7, wherein the added fluid path conduit comprises fluid passages that are provided via one or more openings in walls of the valve portion.

11. The valve portion of claim 10, wherein the one or more openings are created via at least one of milling, drilling and boring.

12. The valve portion of claim 1, wherein the automatic transmission operation comprises a 4L80 transmission.

13. A method of modifying a valve portion in a transmission valve body of a vehicle having a first control mechanism including one or more actuating devices to control fluid-based operation within the valve portion, wherein the one or more actuating devices provide the vehicle with a first level of automatic transmission operation when the valve portion is unmodified, the method comprising:
    when the valve portion is modified, emplacing a second control mechanism that allows additional fluid-based operation within the valve portion;
    wherein a combination of the first control mechanism and the second control mechanism controls fluid flow in an added fluid path conduit in the modified valve portion and results in a second level of automatic transmission operation for the vehicle.

14. The method of claim 13, wherein the added fluid path conduit is provided via at least one of filling a fluid path, diverting the fluid path, and blocking the fluid path.

15. The method of claim 14, wherein diverting the fluid path comprises at least one of providing one or more openings in walls of the second fluid path and forming bores in the walls of the second fluid path.

* * * * *